United States Patent
Heckmann et al.

(10) Patent No.: US 7,352,079 B2
(45) Date of Patent: Apr. 1, 2008

(54) ELECTRONIC BALLAST FOR A LAMP

(75) Inventors: Markus Heckmann, München (DE);
Alfons Lechner, Hohenwart (DE);
Thomas Siegmund, Otterfing (DE)

(73) Assignee: Patent-Treuhand-Gesellschaft für Elektrische Glühlampen mbH, Munich (DE)

( * ) Notice: Subject to any disclaimer, the term of this patent is extended or adjusted under 35 U.S.C. 154(b) by 177 days.

(21) Appl. No.: 11/402,901

(22) Filed: Apr. 13, 2006

(65) Prior Publication Data
US 2006/0232225 A1 Oct. 19, 2006

(30) Foreign Application Priority Data
Apr. 14, 2005 (DE) .................. 10 2005 017 323

(51) Int. Cl.
*H02J 3/02* (2006.01)
(52) U.S. Cl. .......................... 307/2; 315/127
(58) Field of Classification Search ........ 315/126–127, 315/159, 185 R, 186, 193, 209 R, 209 CD, 315/227 R, 231, 362; 361/42, 54, 55, 59; 307/2, 4, 5, 8, 38, 39, 77–78, 80, 157
See application file for complete search history.

(56) References Cited
U.S. PATENT DOCUMENTS
4,156,150 A * 5/1979 Harrigan et al. ................ 307/2
5,798,573 A * 8/1998 Saganovsky ..................... 307/4
6,548,989 B2 * 4/2003 Duff, Jr. ......................... 320/166
6,633,154 B1 * 10/2003 Duff, Jr. ......................... 320/166
6,768,271 B2 * 7/2004 Busse et al. ............. 315/209 R

OTHER PUBLICATIONS

J. Wüstehube "Schaltnetzteile: Grundlagen, Entwurf, Schaltungsbeispiele" [Switched mode power supplies: fundamentals, design, circuit examples], Grafenau/Württemberg, Expert-Verlag, 1982, cf. figure 13.3.

* cited by examiner

*Primary Examiner*—Douglas W. Owens
*Assistant Examiner*—Minh Dieu A
(74) *Attorney, Agent, or Firm*—Carlo S. Bessone

(57) ABSTRACT

An electronic ballast for a lamp has a DC voltage connection; a switching unit having a supply voltage with the DC voltage connection being coupled thereto, and a first capacitor coupled between the supply voltage connection and a reference potential; an AC voltage connection, at which a voltage can be made available which has at least one AC component. The series circuit includes a first nonreactive resistor and a first diode, as a second nonreactive resistor coupled between the AC voltage connection and the supply voltage connection, a connection point between the first diode and the second nonreactive resistor, and a second capacitor coupled between the connection point and the reference potential. The first capacitor and the second nonreactive resistor are dimensioned such that the average voltage drop across the second nonreactive resistor is greater than or equal to the average voltage drop across the first capacitor.

12 Claims, 2 Drawing Sheets

ELECTRONIC BALLAST FOR A LAMP

FIELD OF THE INVENTION

The present invention relates to an electronic ballast for a lamp, in particular an electronic ballast for a lamp having a DC voltage connection, at which a DC voltage can be made available, a switching unit which has a supply voltage connection, the DC voltage connection being coupled to the supply voltage connection of the switching unit, and a first capacitor being coupled between the supply voltage connection and a reference potential, an AC voltage connection, at which a voltage can be made available which has at least one AC component, the series circuit comprising a first nonreactive resistor and a first diode being coupled between the AC voltage connection and the supply voltage connection.

BACKGROUND OF THE INVENTION

J. Wüstehube "Schaltnetzteile: Grundlagen, Entwurf, Schaltungsbeispiele" [Switched mode power supplies: fundamentals, design, circuit examples], Grafenau/Württemberg, Expert-Verlag, 1982, cf. FIG. 13.3 therein, has disclosed a 12 W flyback converter switched mode power supply having a DC voltage connection, at which a DC voltage can be made available, a switching unit which has a supply voltage connection, the DC voltage connection being coupled to the supply voltage connection of the switching unit, and a first capacitor being coupled between the supply voltage connection and a reference potential, an AC voltage connection, at which a voltage can be made available which has at least one AC component, the series circuit comprising a first nonreactive resistor and a first diode as well as a second nonreactive resistor being coupled between the AC voltage connection and the supply voltage connection, a connection point being defined between the first diode and the second nonreactive resistor, and a second capacitor being coupled between said connection point and the reference potential. However, since this switched mode power supply has a different purpose than an electronic ballast according to the invention, in particular the relevant part of the circuit therein envisages another function to that of the electronic ballast according to the invention, cf. the embodiments relating to this further below, reference is initially made to the circuit arrangement illustrated in FIG. 1, which is known from the prior art and which is implemented in an electronic ballast, in order to illustrate the problem on which the invention is based:

Modern electronic ballasts for lamps are equipped with open-loop and/or closed-loop control electronics which comprise an ASIC or a microcontroller. Such components generally require a voltage supply which is stable in all operating modes and even at a low system voltage and should be designed so as to be as low-loss as possible in the electronic ballast. In FIG. 1, the switching unit of the open-loop and/or closed-loop control electronics is denoted by 10. At its supply voltage connection 12, into which a current $I_S$ flows during operation of the switching unit 10, two supply paths are coupled, namely from a DC voltage source at the connection 14 and from an AC voltage source at the connection 16. In this case, a capacitor C1 is slowly charged via a highly resistive resistor R3 from the DC voltage source 14, which in particular makes available the rectified system voltage. R3 is to be designed to have a high resistance value since a low-resistance design would lead to high permanent losses and thus to high temperatures at the resistor R3 during operation. The capacitor C1 is moreover charged from an internal AC voltage source of the electronic ballast, for example the PFC (power factor correction) control winding or the trapezoidal capacitor, via the series circuit comprising a nonreactive resistor R1 and a diode D1. Owing to the diode D1, the AC voltage signal at the connection 16 is rectified. The zener diode D3 at the supply connection 12 of the switching unit 10 limits the voltage across the capacitor C1 to the maximum permissible value for the switching unit 10. At times when there is an excessive supply of current, i.e. in particular in the case of an AC voltage having a high amplitude at the connection 16, this energy is not stored in the capacitor C1 but is diverted, via the zener diode D3, to the reference potential and converted into heat. At times when there is a low supply of energy via the AC voltage connection 16, there is the risk of the energy which can be made available via the DC voltage connection 14 being insufficient for supplying the switching unit 10, i.e. the voltage potential at the input 12 of the switching unit 10 is reduced to below the permissible minimum value. In this context, reference is made to FIG. 3, which shows the temporal voltage profile at the connection 12 of the switching unit 10 for the circuit arrangement illustrated in FIG. 1. A minimum voltage of 15 V should generally not be undershot. As shown in FIG. 3, the voltage $U_{C1}$ is reduced temporarily down to 13.08 V.

SUMMARY OF THE INVENTION

The object of the present invention therefore consists in developing the switching unit illustrated in FIG. 1 in a generic electronic ballast such that it is possible to ensure a voltage supply for the switching unit which is as reliable as possible.

The following invention is based on the knowledge that an additional capacitor can be charged to a higher voltage and thus more energy can be stored in this capacitor ($E=\frac{1}{2}CU^2$) if this capacitor is not connected in parallel with a zener diode which would limit the maximum charge voltage of the capacitor. If this additional capacitor is coupled to the first capacitor via a nonreactive resistor, the additional capacitor can thus make available its energy, via this resistor, to the supply connection 12 of the switching unit 10, if required. As a result of the fact that the first capacitor and the second nonreactive resistor are dimensioned such that the average voltage drop across the second nonreactive resistor is greater than or equal to the average voltage drop across the first capacitor, it is established that the voltage drop across the additional capacitor is at least two times the value of the voltage drop across the first capacitor. This means, conversely, that, in comparison to the prior art shown in FIG. 1, components having a high amplitude in the AC voltage signal present at the connection 16 are utilized for charging the additional capacitor and are not converted into heat.

The abovementioned circuit arrangement illustrated in FIG. 13.3 of Wüstehube cannot anticipate the knowledge of the invention since, as can clearly be seen, it is used for other purposes: by means of the transistor T1 the supply of energy via the DC voltage connection can be connected at a low resistance. As a result of the fact that the transistor T1 is arranged in the DC supply path, the problem of high losses at a highly resistive nonreactive resistor in the DC supply path does not arise. The transistor T1 can therefore be switched over as a function of the state of charge of the capacitor C2 there, which makes available the supply voltage for the switching unit. The regulated voltage across the winding N3 of the transformer Tr1 is present at the input of the diode D8. This voltage is used, via the diode D8, for charging the capacitor C12. The charge at the capacitor C12 is used, via the series circuit comprising the diode D6 and the resistor R18, to charge the capacitor C2, which is connected in parallel with a zener diode D2.

In Wüstehube, the potential which is tapped off as the AC voltage source thus does not make available a severely modulated AC voltage signal owing to the regulating effect of the circuit, but makes available a regulated signal having only a slight degree of modulation. That is to say, the voltage across the capacitor C12 is adjusted to a constant value, as is the voltage across the capacitor C17 of the electrically isolated switched mode power supply output. For this purpose, a desired voltage value is formed from the voltage across the capacitor C12 and fed to the module TDA1060 by means of a voltage divider which comprises the resistors R17, R13 and R12.

C12 is given the value 22 µF, and C2 is given the value 4.7 µF.

In order to utilize a high voltage at the AC voltage connection, however, the capacitance of C12 would have to be selected to be lower than the capacitance of C2. However, the present invention attempts to actually make use of the high voltage amplitudes occurring in the case of severe modulation. Wüstehube, 1982 thus shows a comparable circuit design, but this circuit design cannot be used for achieving the object according to the invention owing to the dimensions which are likewise given.

One particularly preferred embodiment of the present invention is characterized by the fact that a second diode is coupled between the second nonreactive resistor and the supply voltage connection. Owing to this measure, the high time constant $T_G$ of the DC voltage supply path, which corresponds to the product of the resistor R3 and the capacitor C1, is decoupled from the time constant $T_W$ of the AC voltage supply path, which corresponds to the product of the resistor R1 and the capacitor C2. Without the diode D2, the time constant of the DC voltage supply path would increase to $T_G=R3\times(C1+C2)$. Owing to the use of the second diode, this makes it possible for the switching unit 10 to be supplied with voltage and to start, despite a high time constant $T_W$ of the AC voltage supply path, even after only a short period of time, which is determined by the time constant of the DC voltage supply path.

In order to keep the voltage at the input of the supply voltage connection of the switching unit constant, it is particularly preferred if a zener diode is coupled between the supply voltage connection and the reference potential.

If, during operation of the switching unit, the current consumption of the switching unit is $I_S$, the voltage drop across the zener diode is $U_{D3}$ and the voltage drop across the second capacitor is $U_{C2}$, then the optimum design for the second nonreactive resistor is $R2=(U_{C2}-U_{D3})/I_S$. According to the invention, discrepancies of plus/minus 20% from this optimum value are considered as a preferred embodiment. The optimum design for R2 ensures that as good as no energy at all is diverted unused by the zener diode D3 to the reference potential. Owing to this design, the energy supplied via the AC voltage connection is essentially completely used for supplying the switching unit 10.

In one further preferred embodiment, a third nonreactive resistor is coupled between the DC voltage connection and the supply voltage connection. Owing to this resistor, the internal resistance of the DC voltage source, which is connected to the DC voltage connection 14, can be modified and, as a result, the time constant $T_G$ of the DC voltage supply path.

The third nonreactive resistor preferably has a higher value than the second nonreactive resistor by at least a factor of 30. As a result, charging of the first capacitor from the DC voltage source is limited. It is further preferred if the capacitance of the second capacitor is greater than the capacitance of the first capacitor, in particular by at least a factor of 20. In comparison to this, in the case of Wüstehube, see above, the ratio is merely 4.7.

Further preferred embodiments are described in the dependent claims.

BRIEF DESCRIPTION OF THE DRAWINGS

One exemplary embodiment of the invention will now be described in more detail below with reference to the attached drawings, in which.

DETAILED DESCRIPTION OF THE INVENTION

Figure 1:
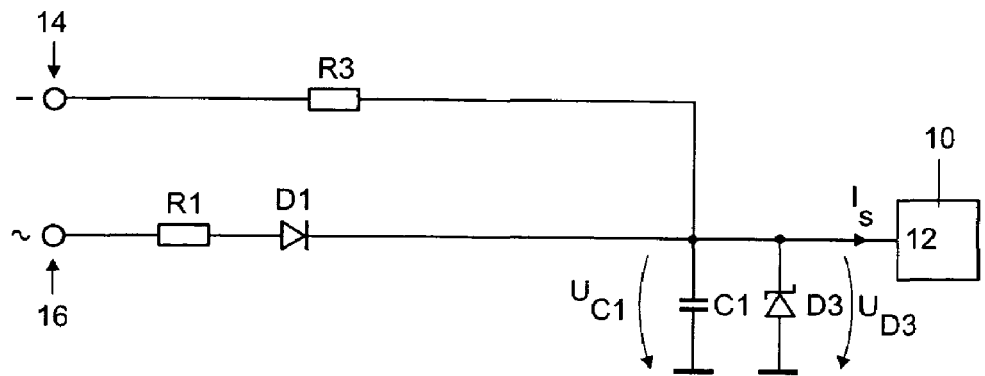
FIG. 1 shows a section of an electronic ballast known from the prior art for a lamp.
Figure 2:
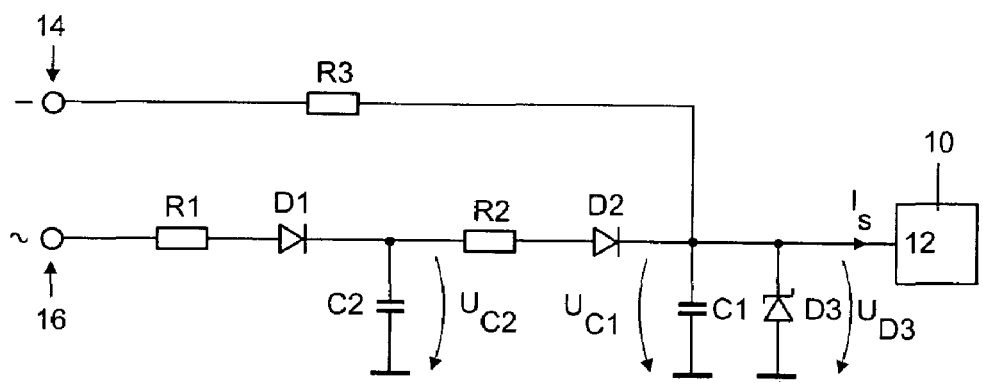
FIG. 2 shows a section of an electronic ballast according to the invention for a lamp.
Figure 3:
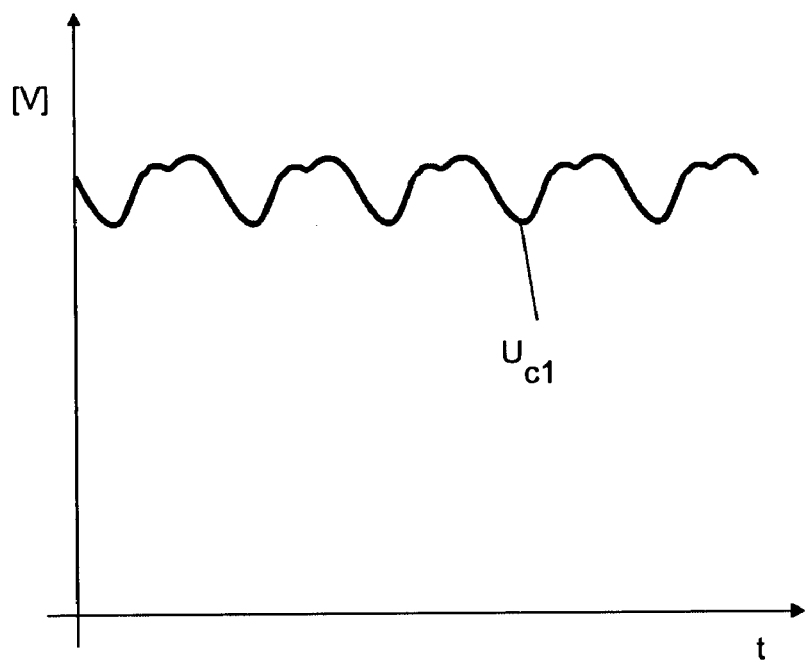
FIG. 3 shows the temporal profile of the voltage across the capacitor C1 for the circuit arrangement known from the prior art shown in FIG. 1.

The references introduced in connection with FIG. 1 also apply to the circuit arrangement in FIG. 2, so long as they relate to identical or comparable components, and are therefore not mentioned again. In comparison to the circuit arrangement in FIG. 1, the circuit arrangement in FIG. 2 is characterized by the fact that, firstly, the series circuit comprising a nonreactive resistor R2 and a diode D2 has been inserted between the supply voltage connection 12 of the switching unit 10 and the diode D1, and, secondly, a capacitor C2 is coupled between the connection point between the diode D1 and the nonreactive resistor R2 and the reference potential. According to the invention, the capacitor C1 and the nonreactive resistor R2 are dimensioned such that the average voltage drop across the nonreactive resistor R2 is greater than or equal to the average voltage drop across the capacitor C1. Conversely, this means that the voltage $U_{C2}$ is at least twice as high as the voltage $U_{C1}$.

In one particularly preferred embodiment, $I_S=10$ mA, $U_{C1}=16$ V, $U_{R2}=16$ V, $U_{C2}=16$ to 32 V, R2=1 kΩ, R1=100Ω, R3=1 MΩ, C1=100 nF and C2=2.2 µF.

Figure 4:
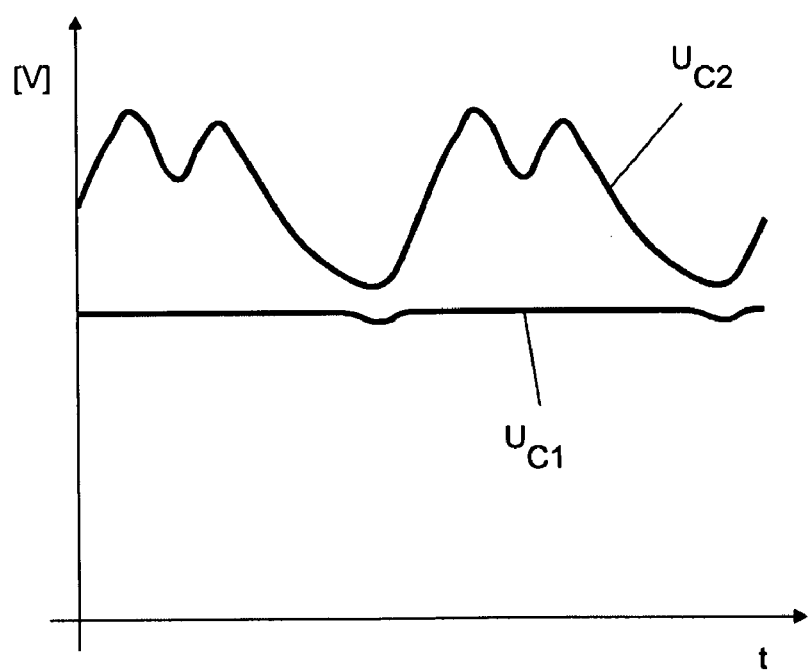
FIG. 4 shows the temporal profile of the voltages $U_{C1}$ and $U_{C2}$ for the circuit arrangement according to the invention shown in FIG. 2.

For this exemplary embodiment, FIG. 4 shows the temporal profile of the voltages $U_{C1}$ and $U_{C2}$. As can clearly be seen, the minimum value for the voltage $U_{C2}$ is 17.6 V, and the maximum value is 30.8 V. As desired, the voltage $U_{C1}$ is essentially constant ($U_{C1}$ RMS=16.17 V) and no longer falls below 15 V.

The invention claimed is:
1. An electronic ballast for a lamp having
   a DC voltage connection (14), at which a DC voltage can be made available;
   a switching unit (10) which has a supply voltage connection (12), the DC voltage connection (14) being coupled to the supply voltage connection (12) of the switching unit (10), and a first capacitor (C1) being coupled between the supply voltage connection (12) and a reference potential;

an AC voltage connection (16), at which a voltage can be made available which has at least one AC component, a series circuit comprising a first nonreactive resistor (R1) and a first diode (D1) being coupled between the AC voltage connection (16) and the supply voltage connection (12), characterized in that a second nonreactive resistor (R2) is coupled between the series circuit comprising the first nonreactive resistor (R1) and the first diode (D1), a connection point being defined between the first diode (D1) and the second nonreactive resistor (R2), and a second capacitor (C2) being coupled between said connection point and the reference potential, and the first capacitor (C1) and the second nonreactive resistor (R2) being dimensioned such that the average voltage drop across the second nonreactive resistor (R2) is greater than or equal to the average voltage drop across the first capacitor (C1).

2. The electronic ballast as claimed in claim 1, characterized in that a second diode (D2) is coupled between the second nonreactive resistor (R2) and the supply voltage connection (12).

3. The electronic ballast as claimed in claim 2, characterized in that a zener diode is coupled between the supply voltage connection (12) and the reference potential.

4. The electronic ballast as claimed in claim 3, characterized in that, during operation of the switching unit, the current consumption of the switching unit (10) is $1_s$, the voltage drop across the zener diode is $U_{D3}$ and the voltage drop across the second capacitor (C2) is $U_{C2}$, the second nonreactive resistor (R2), with a discrepancy of plus/minus 20%, being defined as:

$$R2=(U_{C2}-U_{D3})/I_S.$$

5. The electronic ballast as claimed in claim 2, characterized in that a third nonreactive resistor (R3) is coupled between the DC voltage connection (14) and the supply voltage connection (12).

6. The electronic ballast as claimed in claim 5, characterized in that the third nonreactive resistor (R3) has a higher value than the second nonreactive resistor (R2), in particular by at least a factor of 30.

7. The electronic ballast as claimed in claim 1, characterized in that a zener diode is coupled between the supply voltage connection (12) and the reference potential.

8. The electronic ballast as claimed in claim 7, characterized in that, during operation of the switching unit, the current consumption of the switching unit (10) is $I_S$, the voltage drop across the zener diode is $U_{C3}$ and the voltage drop across the second capacitor (C2) is $U_{C2}$, the second nonreactive resistor (R2), with a discrepancy of plus/minus 20%, being defined as:

$$R2=(U_{C2}-U_{D3})/I_S.$$

9. The electronic ballast as claimed in claim 1 characterized in that a third nonreactive resistor (R3) is coupled between the DC voltage connection (14) and the supply voltage connection (12).

10. The electronic ballast as claimed in claim 9, characterized in that the third nonreactive resistor (R3) has a higher value than the second nonreactive resistor (R2), in particular by at least a factor of 30.

11. The electronic ballast as claimed in claim 1 characterized in that the capacitance of the second capacitor (C2) is greater than the capacitance of the first capacitor (C1), in particular by at least a factor of 20.

12. The electronic ballast as claimed in claim 1, characterized in that the capacitance of the second capacitor (C2) is greater than the capacitance of the first capacitor (C1), in particular by at least a factor of 20.

* * * * *